(12) United States Patent
Robinson

(10) Patent No.: US 6,520,547 B2
(45) Date of Patent: Feb. 18, 2003

(54) QUICK LOCKING PIPE JOINT FOR PLAIN OR PROFILED PIPE

(75) Inventor: Michael I. Robinson, Mountlake Terrace, WA (US)

(73) Assignee: Phoenix Geometrix, LLC, Mountlake Terrace, WA (US)

( * ) Notice: Subject to any disclaimer, the term of this patent is extended or adjusted under 35 U.S.C. 154(b) by 0 days.

(21) Appl. No.: 10/066,357

(22) Filed: Jan. 31, 2002

(65) Prior Publication Data

US 2002/0101078 A1 Aug. 1, 2002

Related U.S. Application Data

(60) Provisional application No. 60/266,075, filed on Feb. 1, 2001.

(51) Int. Cl.$^7$ .............................................. F16L 35/00
(52) U.S. Cl. ........................ 285/330; 285/27; 285/403; 285/404
(58) Field of Search .......................... 285/27, 330, 403, 285/404, 913, 914

(56) References Cited

U.S. PATENT DOCUMENTS

| | | | |
|---|---|---|---|
| 25,117 A | 8/1859 | Heneage | |
| 74,950 A | 2/1868 | Steger | |
| 437,915 A | 10/1890 | Costigan | |
| 643,358 A | 2/1900 | Konold | |
| 813,792 A | 2/1906 | Gooch et al. | |
| 1,065,492 A * | 6/1913 | Abbott | 220/3.94 |
| 2,465,708 A * | 3/1949 | Chapin | 285/5 |
| 2,926,028 A | 2/1960 | Hookings et al. | |
| 3,136,570 A * | 6/1964 | Lee | 285/330 |
| 3,178,210 A * | 4/1965 | Dickinson | 403/292 |
| 3,189,372 A | 6/1965 | Johnson | |
| 3,443,827 A * | 5/1969 | Acker et al. | 285/39 |
| 3,514,132 A * | 5/1970 | Peabody | 285/331 |
| 4,280,723 A * | 7/1981 | Moldestad | 285/376 |
| 4,611,829 A * | 9/1986 | Hughes | 285/18 |
| 4,878,695 A | 11/1989 | Whitham | |
| 4,907,828 A * | 3/1990 | Chang | 285/24 |
| 5,015,014 A | 5/1991 | Sweeney | |
| 5,029,904 A | 7/1991 | Hunt | |
| 5,176,406 A * | 1/1993 | Straghan | 285/24 |
| 5,188,399 A | 2/1993 | Durina | |
| 5,290,974 A | 3/1994 | Douglas et al. | |
| 5,314,024 A | 5/1994 | Rodgers et al. | |
| 5,662,360 A | 9/1997 | Guzowski | |
| 5,769,460 A | 6/1998 | Imai | |
| 5,782,310 A * | 7/1998 | Lange | 175/323 |
| 5,875,976 A | 3/1999 | Nelson et al. | |
| 5,906,398 A | 5/1999 | Larsen et al. | |
| 5,915,738 A | 6/1999 | Guest | |
| 5,921,591 A | 7/1999 | Argent | |
| 6,092,844 A | 7/2000 | Lee | |
| 6,102,448 A * | 8/2000 | Fixemer et al. | 285/330 |
| 6,409,221 B1 * | 6/2002 | Robinson et al. | 285/91 |

* cited by examiner

Primary Examiner—Lynne H. Browne
Assistant Examiner—James M. Hewitt
(74) Attorney, Agent, or Firm—Christensen O'Connor Johnson Kindness PLLC

(57) ABSTRACT

A pipe and pipe coupling assembly (10) including a pipe (20) having a first end (72) and a pipe (22) having a second end (74). The first end (72) includes a threaded portion (60) and a keyway (32), and is adapted to slidably engage the second end (74). The second end (74) includes a key portion (36) that is adapted to engage the keyway (32), thereby impeding the rotation of the pipe (20) relative to the pipe (22). The pipe and pipe coupling assembly (10) further includes a coupling member (34) adaptable to be rotatably attached to the second end (74). The coupling member (34) further includes a threaded portion (58) operable to engage the threaded portion (60) of the first end (72), thereby removably coupling the pipe (20) to the pipe (22) in a keyed, end to end relationship.

12 Claims, 6 Drawing Sheets

QUICK LOCKING PIPE JOINT FOR PLAIN OR PROFILED PIPE

CROSS-REFERENCE TO RELATED APPLICATION

This application claims the benefit of U.S. Provisional Patent Application No. 60/266,075, filed on Feb. 1, 2001, the disclosure of which is hereby expressly incorporated by reference, and priority from the filing date of which is hereby claimed under 35 U.S.C. §119.

FIELD OF THE INVENTION

The present invention relates generally to pipe and pipe coupling assemblies, and more particularly, to pipe and pipe coupling assemblies that are indexable and that may be disassembled.

BACKGROUND OF THE INVENTION

Pipes and piping systems are useful in a wide variety of applications. Piping systems for transporting or routing solids, liquids, and gases, for example, are virtually ubiquitous throughout home and industry. When installing a piping system, individual pipes are typically acquired in set lengths, and must be assembled by cutting and joining the pipes to produce the desired piping configuration. Different applications may present different pipe joint requirements. In most applications it is important that the pipe joints be strong, so that they do not become failure points for the piping system. This is particularly important when the joints are not easily accessible. In some applications, easy disassembly of the piping joint is desirable—for example, in applications where the piping system is temporary and will ultimately be removed, or in order to accommodate difficulties that might be encountered during field assembly. Also, in many applications it is important that the pipe joints be sealed, either to prevent the material transported within the piping system from leaking out, or to prevent external fluids or contaminates from leaking into the pipe system—or both.

Many different systems have been developed to facilitate assembling and joining pipes, with some systems being more or less suitable for any given application. For example, a home water system employing copper piping is typically installed using sleeve joint elements that are soldered to the pipe. This produces a strong, reliable, and generally permanent pipe joint. Home irrigation systems, on the other hand, typically employ plastic piping that is joined using male and female joint elements that are glued together. This type of piping system is very flexible, easily installed, and relatively inexpensive. Neither of these methods allows for easy disassembly of the piping joints or indexing of one pipe relative to another.

It is sometimes desirable to have a pipe joint that will rotationally index the pipes being joined. For example, inclinometers are frequently used in geological applications to monitor the movement of soil in a specific area of interest. Inclinometers measure inclination relative to the vertical axis, and periodic measurements taken with an inclinometer along a conduit installed in the ground can be compared to detect changes. Typically, a plastic pipe conduit is installed in a drill hole in a generally vertical orientation. The plastic pipe conduit includes oppositely disposed longitudinal grooves along its inner surface that provide a track for the inclinometer, which records inclination while being lowered through the plastic conduit. Because the profiled pipe conduit is constructed by joining a number of separate pipes, the individual pipes must be rotationally aligned, or indexed, so that the longitudinal grooves in the profiled pipes form a continuous track along the length of the pipe conduit. Inclinometers are typically used to monitor movement in landslide-prone areas; monitor dam and embankment performance; determine movement of retaining walls, diaphragm walls, and sheet piles; monitor laterally loaded piles; measure ground movement due to tunneling; and to monitor settlement of landfills, tank foundations, and embankments.

A typical inclinometer system includes a probe, a cable, and a readout. The probe includes a tube with two sets of longitudinally aligned wheels that ride within opposing, longitudinally oriented grooves in an inclinometer conduit placed within the drill hole. The probe contains two tilt sensors-one aligned in the plane of the wheels, and the other in a plane oriented perpendicular to the plane containing the wheels.

The cable is used to raise and lower the probe in the inclinometer conduit and provides conductors for providing power and to transfer signals to and from the probe to a readout device. The cable is marked at intervals of a known distance. The probe is lowered to the bottom of the conduit to be surveyed and drawn toward the surface using the cable. Each time a mark on the cable coincides with the top of the conduit, the probe is halted and a reading is taken until the probe reaches the top of the conduit. A survey conducted in the described manner provides a profile of the drill hole with reference to vertical. By comparing profiles over time, deflection and rate of movement can be calculated.

However, prior to commencement of monitoring, a drill hole with an outer drill casing must be created and an inclinometer conduit installed therewithin. The creation of drill holes and installation of a drill hole casing are well known in the art and will not be described further. The inclinometer conduit is then installed concentrically within the drill casing. After the drill hole and drill casing are installed, a first section of inclinometer conduit is inserted into the drill hole. The remaining sections of inclinometer conduit are successively coupled to one another, until the first section reaches the bottom of the drill hole. For installations in water-filled drill holes, the inclinometer conduit is filled with water, and weights may need to be placed inside the conduit to counter any buoyancy of the inclinometer conduit encountered. Grout is pumped between the drill casing and the inclinometer conduit until all water is displaced and clean grout flows from the drill hole.

The conduit for the inclinometer probe is assembled in the field. Typically, in existing systems, the conduit is constructed from 10-foot sections of pipe, where each section of pipe has a female end and a male end. The male end is inserted within the female end and joined in the field by a combination of solvent cement and rivets. Although inclinometer conduits joined in this manner are somewhat effective, they are not without their problems. Many users find cementing, drilling, and riveting the pipe sections together a time-consuming and thereby expensive process. The solvent cement plus pre-treatment cleaner can be hazardous to the user/environment and messy to handle. Further, the cemented joint may not set up quickly in cold weather. Further still, the cemented joint does not utilize an adjustable fastening means, such as a threaded fastener, to allow the joint to be progressively tightened during assembly. Consequently, the joints are prone to leaking. Even further still, the traditional assembled joints can only be disassembled through destructive means, such as with a hacksaw. Therefore, when an unexpected withdrawal of an assembled inclinometer conduit from a drill hole is required, logistical problems are often encountered as replacement pipe availability issues cause delays and increased costs.

Further yet, traditional coupling systems typically have low tensile strength. The pipe coupling system must have sufficient tensile strength to allow the assembled conduit to support itself without joint separation when freely hanging in a dry drill hole. Most traditional coupling systems are sufficient in this regard. However, even greater tensile strength is desirable to allow the conduit to be pulled from the drill hole if it becomes stuck during installation. Further still yet, the traditional coupling systems have insufficient torsion strength, and failure may occur when a torque is applied. Typically, torque is applied to the conduit by a hollow stem auger or a drill casing as it is rotated during withdrawal and catches the instrumentation conduit. Good practice dictates that such auger or drill-casing rotation should be avoided; however, regardless of good practice, it does occur, resulting in couplings that are twisted and misaligned.

Still further yet, traditional coupling systems often have insufficient resistance to external pressures. For instance, in deep drill holes or under high grout pump pressures, the pressure of the grout near the base of the drill hole may be sufficient to collapse the conduit or cause the grout to leak into the conduit. Finally, in some cases, traditional pipe coupling systems have insufficient bending strength. Therefore, the assembled joints have insufficient strength to resist damage from bending due to mishandling during installation and in-service lateral soil or rock shear zone displacement.

Thus, there exists a need for an inclinometer conduit joint that is both easy and quick to assemble and disassemble in the field, leak proof, and sufficiently strong to withstand handling (including the inevitable mishandling) as well as external grout pressure during installation.

SUMMARY OF THE INVENTION

In accordance with the present invention, a pipe and pipe coupling assembly is provided. The pipe and pipe coupling assembly includes a first pipe having a substantially cylindrical first end and a second pipe having a substantially cylindrical second end. The first end includes a threaded portion and a keyway, and is adapted to slidably engage the second end. The second end includes a key portion that is adapted to engage the keyway of the first end, thereby rotationally locking the first pipe relative to the second pipe. The pipe and pipe coupling assembly further includes a coupling member having a substantially cylindrical shape and adaptable to be rotatably attached to the second end. The coupling member further includes a threaded portion operable to engage the threaded portion of the first end when the first end slidably engages the second end, thereby removably coupling the first pipe to the second pipe in a keyed, end to end relationship.

In accordance with further aspects of this invention, the first and second ends each have an inner diameter and an outer diameter wherein the outer diameter of the first end is substantially equal to or less than the inner diameter of the second end, thereby allowing the first end to be slidably received within the second end.

In accordance with still further aspects of this invention, the key portion of the second pipe includes a pin and the keyway of the first pipe includes a notch in the second pipe, wherein the notch is adapted to slidably receive the pin when the first end slidably engages the second end.

In accordance with yet still further aspects of this invention, the first and second pipes have an internal profile, wherein when the key portion engages the keyway, the internal profile of the first pipe is aligned with the internal profile of the second pipe.

In accordance with additional aspects of the present invention, the coupling member is operable to couple to the first end and/or second end by hand pressure.

In accordance with further additional aspects of this invention, the coupling member has a first press-to-fit connector operable to engage a second press-to-fit connector disposed on one of the ends of the pipes, thereby allowing the coupling member to be rotatably coupled to one of the pipe ends.

In accordance with yet still further additional aspects of this invention, the first and second pipes each have substantially similar inner and outer diameters. The first and second ends each have a reduced outer diameter portion having a diameter less than the outer diameter of the first and second pipes, wherein the coupling member may at least be partially disposed about the reduced outer diameter portions.

In accordance with other aspects of this invention, each of the first and second pipes has an outer diameter and an inner diameter. The first end has a reduced outer diameter portion having a diameter less than the outer diameter of the first and second pipes. The second end has an increased inner diameter portion having an inner diameter greater than the inner diameter of the first and second pipes. The coupling member is configured so as to be at least partially disposed about the reduced outer diameter portion of the first end and the increased inner diameter portion of the second end.

In accordance with other additional aspects of this invention, the first pipe further includes a female end opposite the first end, wherein the female end is substantially similar to the second end of the second pipe. The second pipe further includes a male end opposite the second end, wherein the male end is substantially similar to the first end of the first pipe.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
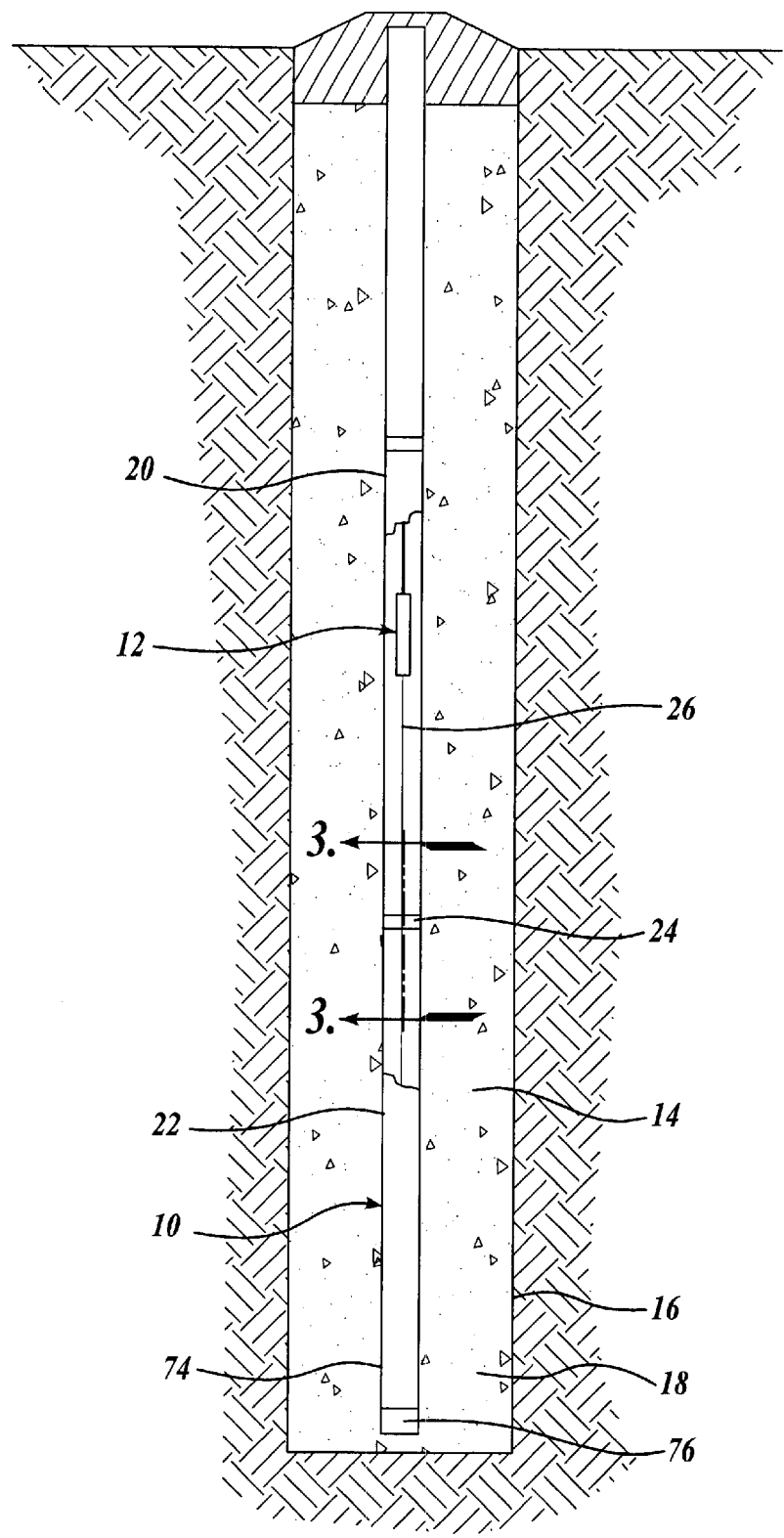
FIG. 1 is an elevation view of one embodiment of a pipe and pipe coupling assembly formed in accordance with the present invention, with the pipe and pipe coupling assembly shown installed in a drill hole (shown in cross-section), and having a portion of the pipe and pipe coupling assembly cut away to show a vertical inclinometer probe suspended therewithin.
Figure 2:
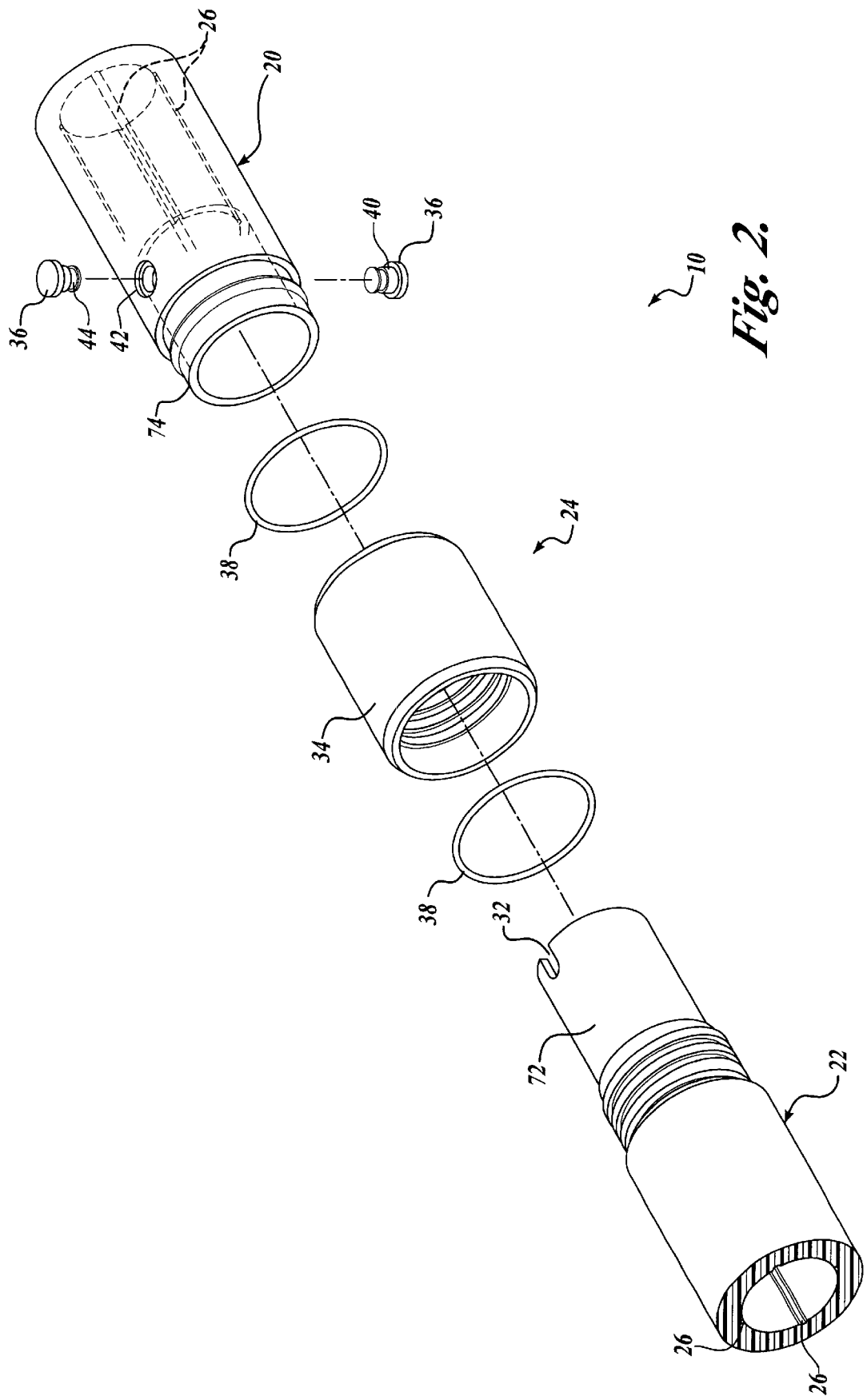
FIG. 2 is an exploded perspective view of a portion of the pipe and pipe coupling assembly shown in FIG. 1.
Figure 3:
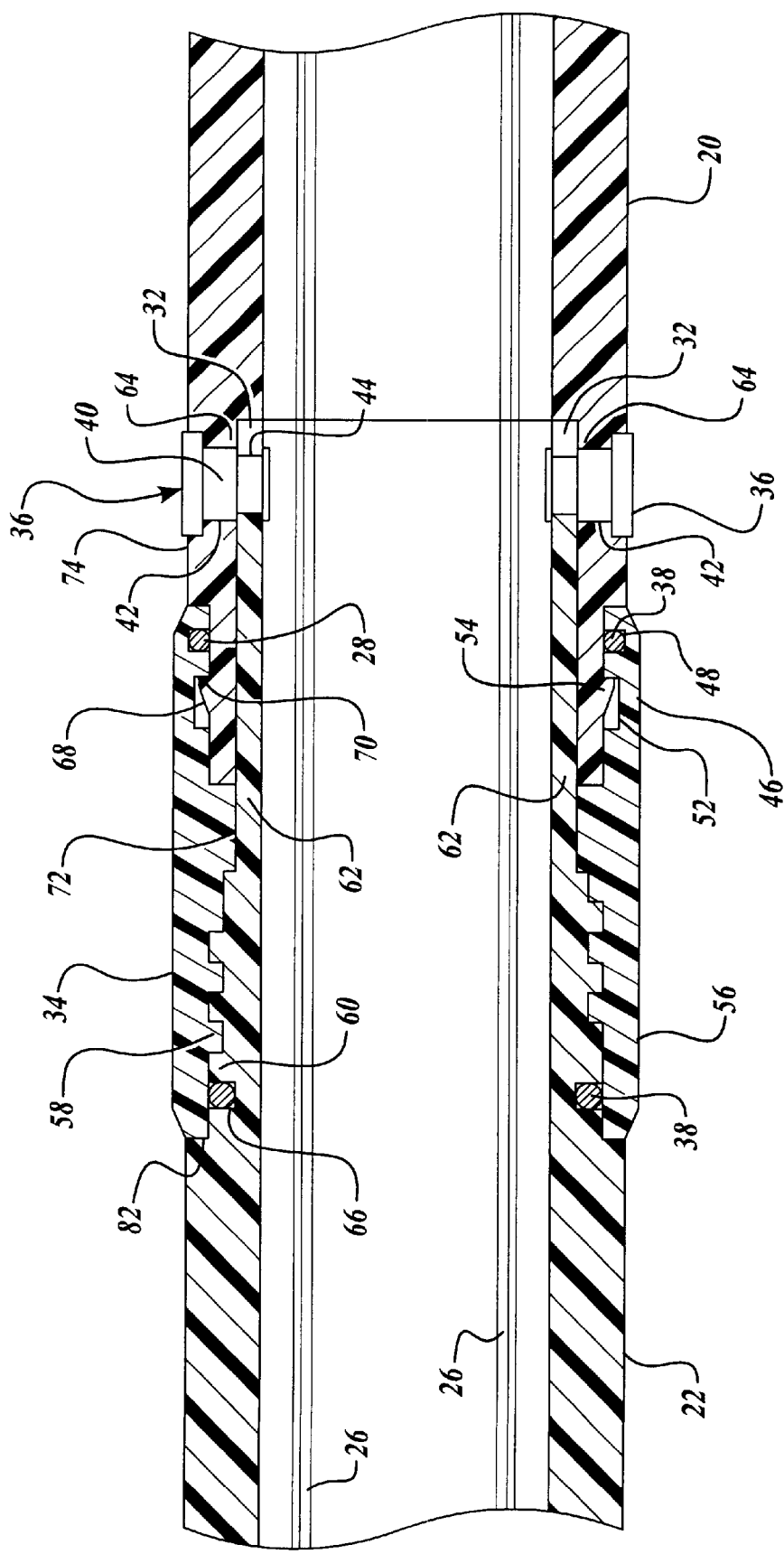
FIG. 3 is a cross-sectional view of a portion of the pipe and pipe coupling, taken substantially through Section 3—3 of FIG. 1.

FIGS. 1–3 illustrate one embodiment of a pipe and pipe coupling assembly 10 formed in accordance with the present invention. Although the illustrated embodiment of the present invention is described as implemented with a vertical inclinometer probe 12, one skilled in the relevant art will appreciate that the disclosed embodiment of the pipe and pipe coupling assembly 10 is illustrative in nature and should not be construed as limited to application with a vertical inclinometer probe 12. It should therefore be apparent that the pipe and pipe coupling assembly 10 has wide application, and may be used in any situation where removably joining two pipe sections together is beneficial. Further, for ease of illustration and clarity, the pipe and pipe coupling assembly 10 of the present invention is shown in a substantially vertical orientation, although it may be suitably used in any orientation, such as horizontal. Therefore, the terminology "vertical," "upper," "lower," "top," "bottom," etc., should be construed as descriptive and not limiting.

Referring now to FIG. 1, a pipe and pipe coupling assembly 10 formed in accordance with the present invention is shown installed within a drill hole 14. The formation of the drill hole 14, the installation of a drill casing 16 at the periphery of the drill hole 14, and the insertion of grout 18 within the drill hole 14 are all well known in the art and therefore will not be described in further detail.

Referring to FIG. 2, the pipe and pipe coupling assembly 10 includes pipes 20 and 22 and a coupling assembly 24 for joining the pipes 20 and 22. The pipes 20 and 22 are substantially identical to one another; each having a male end 72 (one shown) and a female end 74 (one shown) disposed on opposite ends of each pipe 20 and 22. The male and female ends 72 and 74 of each of the pipes 20 and 22 are substantially identical to one another. Therefore, where the context permits, reference in the below description to an element of one of the ends of one of the pipes shall be understood as also referring to the corresponding element in the corresponding end of the other pipe.

The pipes 20 and 22 are preferably formed from an extruded lightweight plastic, such as a copolymer of acrylonitrile, butadiene, and styrene (hereinafter "ABS"), although it should be apparent to one skilled in the art that the pipes 20 and 22 may be formed from any rigid material, including, for example, other suitable plastics or metals. The inner surface of the pipes is profiled, having four internal, longitudinal tracking grooves 26 on the inside wall of each of the pipes 20 and 22. In a contemplated application, the tracking grooves 26 act as guides for the wheels of an inclinometer probe 12 (see FIG. 1), maintaining the orientation of the probe 12 as it traverses the length of the pipes 20 and 22. Although the illustrated embodiment depicts a profiled pipe having longitudinal tracking grooves 26, it is to be understood that pipes having a smooth (unprofiled) inner surface or pipes having profiles of other configurations can be used and fall within the scope of the present invention.

The pipe 20 is coupled to the pipe 22 by a coupling assembly 24. The coupling assembly 24 of the illustrated embodiment of the present invention includes a coupling member 34, two O-rings 38, and two keys, which, in the illustrated embodiment, are comprised of a pair of alignment pins 36. Referring to FIGS. 2 and 3, the alignment pins 36 are installed in aligned and opposing bores 42 in the female end 74 of the pipe 20. The base 40 of each alignment pin 36 engages the corresponding bore 42 formed in the female end 74 of the pipe 20. In the disclosed embodiment, an annular groove 44 is machined in the alignment pins 36. The annular grooves 44 are sized to be received within two keyways, which, in the illustrated embodiment, are depicted as notches 32 provided in the male end 72 of the pipe 22. The position of both the alignment pins 36 and the notches 32 in the pipes 20 and 22 is selected to ensure that when the alignment pins 36 engages the notches 32, the tracking grooves 26 in joined pipes 20 and 22 are aligned. Thus, a set of continuous longitudinal tracking grooves is formed that run the entire length of the joined pipes 20 and 22. Further, it should be apparent to one skilled in the art that the alignment pins 36, in coordination with the notches 32, prevent rotation of the pipe 20 relative to the pipe 22.

The alignment pins 36 of the illustrated embodiment are preferably formed from a rigid material, such as ABS, and are adhered within the bores 42, although it will be apparent to one skilled in the art that they may be fastened by other means, such as by mechanical means. Further, although two alignment pins 36 are depicted in the illustrated embodiment, it should be apparent to one skilled in the art that more or fewer alignment pins 36 may be suitably used with the present invention. Further still, although the illustrated embodiment is depicted with keys and keyways in the form of alignment pins 36 and notches 32, it will be readily apparent that other alignment and key and keyway structures are within the scope of this invention—such as, but not limited to, a slot and groove, pin and groove, or interlocking tine arrangements.

Still referring to FIGS. 2 and 3, the coupling member 34 is a substantially cylindrical structure formed out of a rigid material, such as polyvinyl chloride (hereinafter "PVC"). The coupling member 34 is used to releasably couple the pipes 20 and 22 together in an end-to-end relationship. Referring to FIG. 3, a first end 46 of the coupling member 34 includes first and second interior annular grooves 48 and 52, respectively. The first annular groove 48, is sized and dimensioned to receive an O-ring 38. The O-ring 38 serves to resist the entrance of dirt, grout and other contaminates from entering the interior of the pipes 20 and 22. It should be apparent to one skilled in the art however, that the joint may be sealed by any suitable means, such as through the application of an adhesive or another form of a compression seal. The second annular groove 52 is sized and dimensioned to lockingly receive an outwardly disposed annular barb 54 on the female end 74 of the pipe 20, as will be discussed in further detail below.

The second end 56 of the coupling member 34 includes a threaded portion 58 sized and dimensioned to engage a threaded portion 60 of the pipe 22. In the preferred embodiment, the outer diameter of the coupling member 34 is slightly larger than the outer diameter of the pipes 20 and 22 to provide a raised gripping surface and to provide additional material to increase the strength of the coupling member 34 and thus the joint. However, it should be apparent to one skilled in the art that the coupling member may also have an outer diameter equal to the outer diameter of the pipes 20 and 22, or even less. The outer surface of the coupling member 34 may be provided with gripping structures (not shown for clarity), such as knurls, bumps, or grooves.

The male end 72 of the pipe 22 has a reduced outer diameter portion 62 that is sized and dimensioned to be slidably received within an increased inner diameter portion 64 of the female end 74 of the pipe 20. The male end 72 of the pipe 22 also includes an annular groove 66 sized and dimensioned to receive an O-ring 38. The O-ring 38 serves to resist the entrance of dirt, grout, and other contaminates from entering the interior of the pipes 20 and 22. The two notches 32 discussed above are provided in the distal end of the reduced diameter portion 62 of the pipe 22. In the illustrated embodiment, the male end 72 is integrally formed with the pipe 22 by well known machining or injection molding processes, although it will be apparent to one skilled in the art that the male end 72 may be formed by other suitable techniques know in the art. Further, it should also be apparent to one skilled in the art that the male end 72 may also be a separate entity coupled to the pipe 22 by any well known method, such as by adhesives.

As discussed above, the female end 74 of the pipe 20 includes an annular barb 54. The annular barb 54 has a sloped surface 68 and a retaining wall 70. The annular barb 54 is sized to lockingly engage the second annular groove 52 of the coupling member 34 such that the coupling member 34 is rotatably attached to the pipe 20. In the illustrated embodiment, the female end 74 is integrally formed with the pipe 20 by well known machining or injection molding processes, although it will be apparent to one skilled in the art that the female end 74 may be formed by other suitable techniques know in the art. Further, it should also be apparent to one skilled in the art that the female end 74 may also be a separate entity coupled to the pipe 20 by any well known method, such as by adhesives.

To attach the coupling member 34 to the female end 74 of the pipe 20, the first end 46 of the coupling member 34 is slid over the female end 74, engaging the first end 46 upon the sloped surface 68 of the barb 54. An axial force is applied such that the first end 46 of the coupling member is displaced outwardly, and the annular barb 54 is displaced inwardly until the barb 54 "locks" into the annular groove 52 and the first end 46 engages an external annular groove 28 formed in the outer surface of the female end 74, thereby rotatably coupling the coupling member 34 to the pipe 20. Although the disclosed "press-to-connect" fitting is preferred, it will be apparent to one skilled in the art that any rotatable press-to-connect fitting is suitable for use and is contemplated by the present invention. Preferably, the press-to-connect fitting is engageable by hand pressure, although it is to be understood that press-to-connect fittings requiring mechanical assistance, such as would be provided by tools, are suitable for use and fall within the scope of the present invention.

Referring to FIG. 1, in light of the above discussion of the structure of the pipe and pipe coupling assembly 10, the operation and installation within a drill hole will now be discussed. First, a vertical drill hole 14 with a drill casing 16 is installed by methods well known in the art. Next, an end cap 76 may be placed on the female end 74 of the pipe 22 and the pipe 22 is lowered into the drill casing 16.

Referring now to FIGS. 1–3, one of the O-rings 38 may be lubricated, or alternately, may not be lubricated, and installed in the annular groove 66 of the male end 72 of the pipe 22. The remaining O-ring 38 may be lubricated, or alternately may not be lubricated, and installed in the annular groove 48 of the coupling member 34. The lubrication of the O-rings 38 facilitates the later removal of the coupling member 34. The coupling member 34 may then be pressed, preferably by hand pressure, onto the female end 74 of the pipe 20 until the annular barb 54 is engaged within the annular recess 52 of the coupling member 34, as described above. Preferably, the coupling member 34 is pressed onto the female end 74 of the pipe 20 prior to arrival at the installation site, however, the coupling member 34 may also be installed at the installation site. The male end 72 of the pipe 22 may then be slidably inserted into female end 74 of the pipe 20. The alignment pins 36 in the pipe 20 are then aligned to engage the notches 32 in the pipe 22, thereby also aligning the longitudinal grooves 26. The male end 72 of the pipe 22 is then further inserted within the female end 74 of the pipe 20, so that the alignment pins 36 partially engage the notches 32.

The internal threads 58 of the coupling member 34 next engage the external threads 60 of the pipe 22. The user may then rotate the coupling member 34, preferably by hand pressure alone, to tightly couple the pipe 22 with the pipe 20. In the preferred embodiment, the second end 56 of the coupling member abuts an annular mating surface 82 of the pipe 22. At this point, the pipe 20 is releasably and sealably joined to the pipe 22 in an end-to-end relationship, as depicted in FIG. 3. Additional pipes may be joined, in the same manner as described above, to the pipes 20 and 22, creating a string of pipes of a selected length. If a problem is encountered, the string of pipes may be raised from the drill hole. As each pipe emerges from the drill hole, the coupling assembly is disassembled, preferably by hand pressure, by rotating the coupling member 34, thereby disengaging the coupling member from the male end 72 of the pipe 22. The coupling member 34 remains coupled to the female end 74 of the pipe 20. Once the problem is corrected, the pipes may be reassembled in the same manner as described above. Although the present invention is depicted for illustrative purposes with the male ends 72 of the pipes 20 and 22 facing in an upward direction in the drill hole, it will be apparent to one skilled in the art that the invention is also suitable for use with the male ends 72 of the pipes 20 and 22 facing in a downward direction in the drill hole.

Referring to FIG. 1, once the pipes 20 and 22 are correctly installed within the drill hole, the annulus between the drill casing 16 and the pipes 20 and 22 forming the inclinometer conduit is filled with a suitable grout 18. When the grout 18 has set, the installation is surveyed with an inclinometer probe 12, as discussed above in the background section and hereby expressly incorporated by reference. The initial data set obtained is compared to subsequent data sets in order to calculate movement and rate of movement as is well known in the art.

Figure 4:
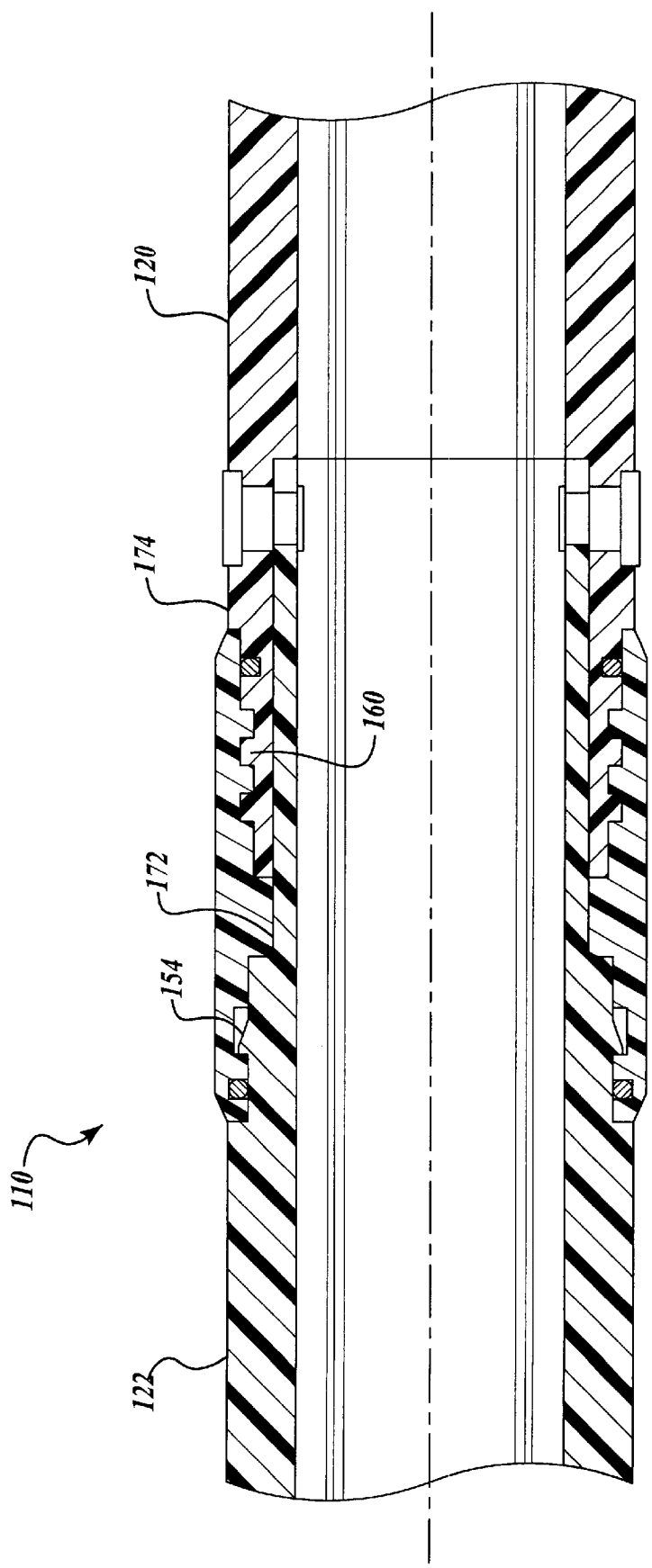
FIG. 4 is a cross-sectional view of an alternate embodiment of a pipe and pipe coupling assembly formed in accordance with the present invention, depicting a threaded portion on a female end of a pipe.

Referring to FIG. 4, an alternate embodiment of a pipe and pipe coupling assembly 110 formed in accordance with the present invention is depicted. The depicted embodiment is substantially similar in construction and operation to the embodiment depicted in FIGS. 1–3; therefore, where context permits, the disclosure of the embodiment depicted in FIGS. 1–3 is hereby expressly incorporated by reference. The embodiment depicted in FIG. 4 varies from the embodiment depicted in FIGS. 1–3 by having the external threaded portion 160 disposed on the female end 174 of the pipe 120, rather than on the male end 172 of the pipe 122, as depicted in FIGS. 1–3. Likewise, the embodiment depicted in FIG. 4 varies from the embodiment depicted in FIGS. 1–3 by having the annular barb 154 disposed on the male end 172 of the pipe 122, rather than on the female end 174 of the pipe 122, as depicted in FIGS. 1–3.

Figure 5:
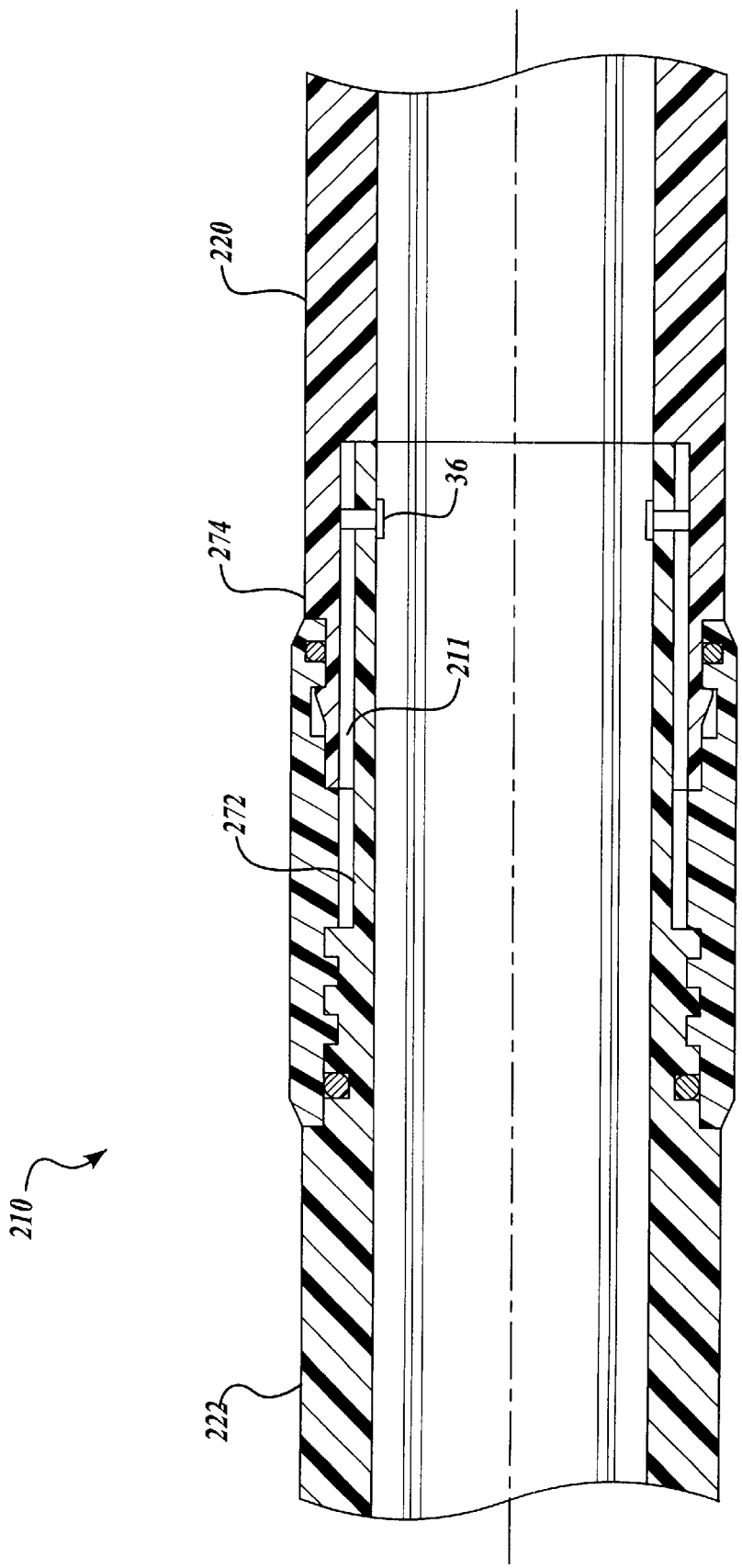
FIG. 5 is a cross-sectional view of a second alternate embodiment of a pipe and pipe coupling assembly formed in accordance with the present invention, depicting a key on a male end of a pipe.

Referring to FIG. 5, an alternate embodiment of a pipe and pipe coupling assembly 210 formed in accordance with the present invention is depicted. The depicted embodiment is substantially similar in construction and operation to the embodiment depicted in FIGS. 1–3; therefore, where context permits, the disclosure of the embodiment depicted in FIGS. 1–3 is hereby expressly incorporated by reference. The embodiment depicted in FIG. 5 varies from the embodiment depicted in FIGS. 1–3 by having a key portion (in the form of alignment pins 36) mounted on the male end 272 of the pipe 222, rather than the female end 274 of the pipe 220 as depicted in FIGS. 1–3. To allow the alignment pins 36 to be slidably received by the female end 274 of the pipe 220, a keyway (in the form of internal longitudinal grooves 211) sized to receive the alignment pins 36 is formed in the female end 274 of the pipe 220, rather than having notches 32 on the male end 272 as depicted in FIGS. 1–3.

Figure 6:
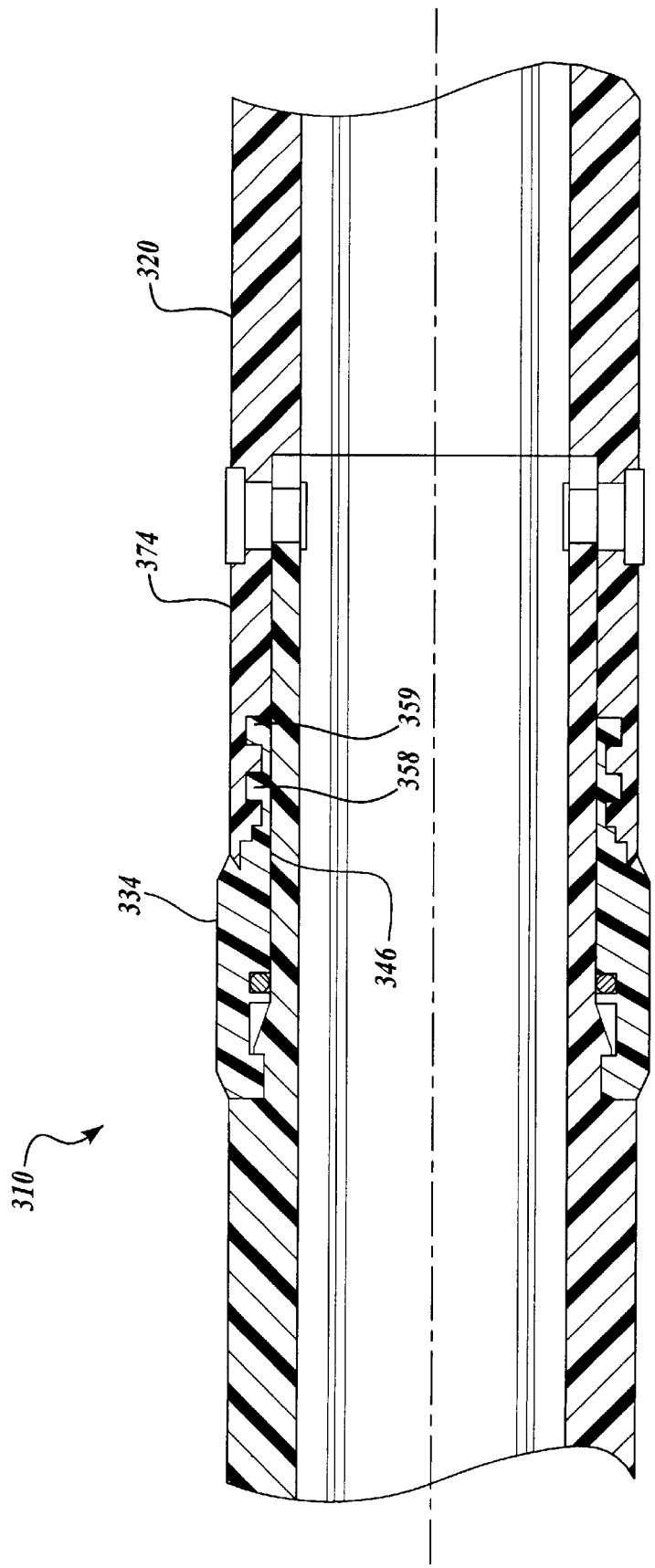
FIG. 6 is a cross-sectional view of a third alternate embodiment of a pipe and pipe coupling assembly formed in accordance with the present invention, depicting a coupling member with a reduced diameter portion having external threads.

Referring to FIG. 6, an alternate embodiment of a pipe and pipe coupling assembly 310 formed in accordance with the present invention is depicted. The depicted embodiment is substantially similar in construction and operation to the embodiment depicted in FIG. 4; therefore, where context permits, the disclosure of the embodiment depicted in FIG. 4 is hereby expressly incorporated by reference. The embodiment depicted in FIG. 6 varies from the embodiment depicted in FIG. 4 by having a reduced outer diameter section 359 on a first end 346 of a coupling member 334 having external threads 358 that engage a female end 374 of a pipe 320, rather than having an internally threaded section on a first end of a coupling member as depicted in FIG. 4 to engage the externally threaded section 160 of the female end 174 of the pipe 120.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pipe and pipe coupling assembly comprising:
   a first pipe having a substantially cylindrical first end, and a second pipe having a substantially cylindrical second end, wherein the first end comprises a threaded portion, and is adapted to slidably engage the second end, the first or second end comprising a key portion that is adapted to engage a keyway disposed on the other of the first or second end, rotationally locking the first pipe relative to the second pipe; and
   a coupling member having a substantially cylindrical shape and adaptable to be rotatably attached to the second end, the coupling member further comprising a threaded portion operable to engage the threaded portion of the first end when the first end slidably engages the second end, thereby removably coupling the first pipe to the second pipe in a keyed, end to end relationship.

2. The pipe and pipe coupling assembly of claim 1, wherein the first and second ends each have an inner diameter and an outer diameter, wherein the outer diameter of the first end is substantially equal to or less than the inner diameter of the second end, thereby allowing the first end to be slidably received within the second end.

3. The pipe and pipe coupling assembly of claim 1, wherein the first and second ends each have an inner diameter and an outer diameter, wherein the outer diameter of the second end is substantially equal to or less than the inner diameter of the first end, thereby allowing the second end to be slidably received within the first end.

4. The pipe and pipe coupling assembly of claim 1, wherein the key portion comprises a pin and the keyway comprises a notch, wherein the notch is adapted to slidably receive the pin when the first end slidably engages the second end.

5. The pipe and pipe coupling assembly of claim 1, wherein the first and second pipes have an internal profile, wherein when the key portion engages the keyway, the internal profile of the first pipe is aligned with the internal profile of the second pipe.

6. The pipe and pipe coupling assembly of claim 5, wherein the internal profile of the first and second pipes is comprised of an internal longitudinal groove.

7. The pipe and pipe coupling of claim 1, wherein the coupling member has a first press-to-connect fitting and the second pipe has a second press-to-connect fitting operable to engage the first press-to-connect fitting, thereby allowing the coupling member to be rotatably coupled to the second pipe by engagement of the second press-to-connect fitting with the first press-to-connect fitting.

8. The pipe and coupling assembly of claim 7, wherein the first press-to-connect fitting is comprised of a protruding member and the second press-to-connect fitting is comprised of a circumferential recess disposed on the second pipe.

9. The pipe and pipe coupling assembly of claim 1, wherein the first and second pipes each have an outer diameter, wherein the first and second ends each have a reduced outer diameter portion having a diameter less than the outer diameter of the first and second pipes, wherein the coupling member may at least be partially disposed about the reduced outer diameter portions.

10. The pipe and pipe coupling assembly of claim 9, wherein the coupling member has an outer diameter greater than the outer diameter of the first and second pipes.

11. The pipe and pipe coupling assembly of claim 1, wherein the first and second pipes each have an outer diameter and an inner diameter, wherein the first end has a reduced outer diameter portion having a diameter less than the outer diameter of the first pipe, wherein the second end has an increased inner diameter portion having an inner diameter greater than the inner diameter of the second pipe, wherein the coupling member may at least be partially disposed within the reduced outer diameter portion of the first end and the increased inner diameter portion of the second end.

12. The pipe and pipe coupling assembly of claim 1, wherein the first pipe further includes a female end opposite the first end, wherein the female end is substantially similar to the second end of the second pipe, and the second pipe further includes a male end opposite the second end, wherein the male end is substantially similar to the first end of the first pipe.

* * * * *

UNITED STATES PATENT AND TRADEMARK OFFICE
CERTIFICATE OF CORRECTION

PATENT NO. : 6,520,547 B2
DATED : February 18, 2003
INVENTOR(S) : M.I. Robinson

It is certified that error appears in the above-identified patent and that said Letters Patent is hereby corrected as shown below:

<u>Title page,</u>
Item [57], ABSTRACT,
Line 7, "the pipe (20) relative to the pipe" should read -- the first pipe (20) relative to the second pipe --
Line 13, "the pipe (20) relative to the pipe (22)" should read -- the first pipe (20) relative to the second pipe (22) --

<u>Column 10,</u>
Line 48, "disposed within" should read -- disposed about --

Signed and Sealed this

Twenty-sixth Day of August, 2003

JAMES E. ROGAN
*Director of the United States Patent and Trademark Office*